2,975,383
Patented Mar. 14, 1961

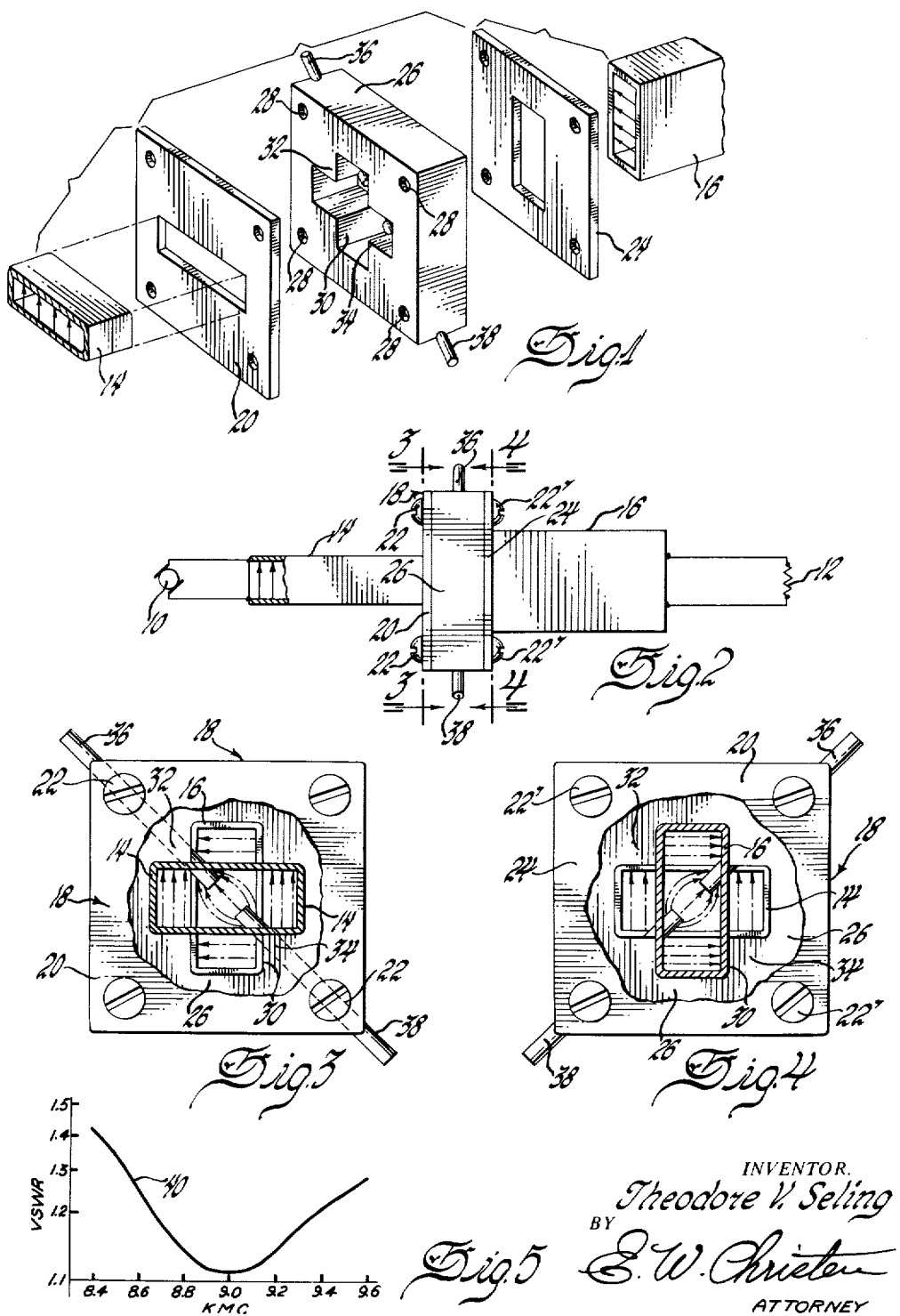

2,975,383
WAVEGUIDE POLARIZATION CONVERTER

Theodore V. Seling, Davison, Mich., assignor to General Motors Corporation, Detroit, Mich., a corporation of Delaware Filed Nov. 4, 1957, Ser. No. 694,368

4 Claims. (Cl. 333—98)

This invention relates to transmission systems for high frequency electromagnetic waves and more particularly to waveguide apparatus for converting the plane of polarization of high frequency waves.

In numerous applications of waveguide systems, it is necessary because of mechanical space limitations or electrical system configuration to rotate the waveguide about its longitudinal axis thus requiring a conversion of the plane of polarization of the transmitted wave. This, of course, must be accomplished with a minimum mismatch of impedance between the rotated sections to avoid impairment of the system by wave reflection or standing waves. In the prior art, this has been accomplished by simply twisting the waveguide about its longitudinal axis with the twist extending over an appreciable number of wave lengths to avoid impedance discontinuity. The disadvantage of such an extended twist section is apparent and in accordance with this invention the change of polarization is accomplished with a minimum of waveguide length. Other prior art systems have been proposed for reducing the waveguide length for change of polarization but are subject to the disadvantage of transmitting only a narrow bandwidth with an acceptable standing wave ratio. The present invention affords a system which provides the polarization conversion with a short section of waveguide and a broad bandwidth of transmission with a minimum of standing wave ratio. This is accomplished by a coupling member interposed between adjacent ends of waveguide sections having their major lateral axes disposed transversely to each other. The coupling member defines a cruciform aperture forming a coextensive continuation of the waveguide sections. A pair of tuning probes extend in diagonal opposition into the aperture and induce rotation of the plane of polarization of the transmitted wave and provide a double tuned circuit affording broad bandwidth coupling.

A more complete understanding of this invention may be had from the detailed description which follows taken with the accompanying drawings in which:

Figure 1 is a perspective exploded view of the inventive system;

Figure 2 is an elevation view of the coupling member;

Figure 3 is a view taken on lines 3—3 of Figure 2 with parts broken away and in section;

Figure 4 is a view taken on lines 4—4 of Figure 2 with parts broken away and in section; and Figure 5 is a plot of voltage standing wave ratio as a function of frequency for a typical embodiment of the invention.

Referring now to the drawings, there is shown an illustrative embodiment of the invention in a waveguide system for transmitting high frequency electromagnetic waves from a voltage source 10 to an electrical load device 12. The voltage source 10 is connected electrically with the rectangular waveguide 14 which is excited thereby in its dominant or $TE_{10}$ mode with the electric field vectors extending parallel with the minor lateral axis of the waveguide 14. The waveguide 14 and a waveguide 16 have their longitudinal axes in alignment and the major lateral axis of the waveguide 14 extends transversely at a right angle to the major lateral axis of waveguide 16. Thus for excitation of both waveguides in the same mode, the polarization of the transmitted wave must be converted or rotated through 90 degrees.

To accomplish this conversion of polarization, the waveguides 14 and 16 are interconnected through the coupling member 18, to be described in detail presently. In a conventional manner, the waveguide 14 terminates in a lateral flange 20 which is secured to the coupling member 18 by screw thread fasteners 22. Similarly, the waveguide 16 terminates in a lateral flange 24 and is secured to the coupling member 18 by screw thread fasteners 22'. The coupling member 18 comprises a conductive body 26 suitably of rectangular external configuration corresponding to that of flanges 20 and 24. The conductive body 26 is provided with screw thread recesses 28 for coaction with the aforementioned screw thread fasteners. The axial length of the conductive body 26 is not critical and may be in the range of ¼ to ½ waveguide wavelength. Throughout this axial length, the conductive body defines a cruciform aperture including four rectangular channels arranged in opposed pairs and bounded by the continuous inner wall 30. It is noted that the longitudinal axis of the conductive body 26 coincides with the longitudinal axes of the waveguides 14 and 16. The aperture includes a cross-sectional area bounded partially by the wall 30 and which conforms to the configuration of the waveguide 14 and the flange 20 thereof forms an end wall covering the remaining area of the aperture, as shown in Figure 3. Similarly, at the opposite end of the conductive body, the aperture includes a cross-sectional area bounded partially by the wall 30 and which conforms to the configuration of waveguide 16 and the flange 24 thereof forms an end wall covering the remaining area of the aperture as shown in Figure 4. Consequently, the cruciform aperture forms a coextensive continuation of the waveguides 14 and 16 throughout the axial length of the conductive body 18. A conductive tuning probe 36 extends into the cruciform aperture diagonally thereof from the innermost corner 32 of the wall 30 and an identical probe 38 extends diagonally opposite into the aperture from the corner 34 of wall 30.

The behavior of the structure just described for effecting a change of polarization may be explained in a non-rigorous fashion by considering the electric potential vectors in the transmitted wave. With the waveguide 14 excited by voltage source 10 in the dominant mode, the electric field vectors have the direction indicated in the drawings with the maximum intensity occurring at the center of the guide. At the juncture with the coupling member 18, the electric potential vectors, because of the discontinuity of the guide surface, tend to crowd in the lateral edges of the guide and at the center of the guide tend to assume a reoriented position as indicated, due to the conductive probes 36 and 38. Because of the angularity of the probes, this reorientation produces a partial rotation of the electric potential vectors at the midpoint of the coupling member 18. As the wave is propagated beyond this point to the juncture with waveguide 16, the electric potential vectors are further rotated in the same direction. Thus, the rotation of the plane of polarization is completed and the waveguide 16 is excited in its dominant mode.

The discontinuity of the guide surface in the coupling member 18 has the effect of reducing the electrical capacitance thereof thus tending to produce an impedance mismatch with the waveguides 14 and 16. However, the conductive probes 36 and 38 are effective to increase the capacitance of the coupling and thus compensate for this discontinuity. Accordingly, good impedance matching is achieved with the result of highly efficient transmission. This characteristic is illustrated in Figure 5 showing the voltage standing wave ratio as a function of frequency in the waveguide 14. It is noted that for a typical embodiment of the invention, a standing wave ratio of about 1.1 has been achieved in the vicinity of the center frequency. Furthermore, the polarization converter is capable of transmission over a broad band of frequencies with a relatively low standing wave ratio as indicated by the curve 40. This is accomplished by virtue of the pair of probes 36 and 38 which provide in effect a double tuned circuit permitting the bandwidth to be adjusted appropriately. In a given system, the probes 36 and 38 may be initially adjusted concurrently to obtain a minimum standing wave ratio at the center frequency and then the probes are independently adjusted to obtain the minimum standing wave ratio at the upper and lower frequencies of the desired bandwidth respectively.

Although the invention has been described with respect to a particular embodiment, such description is not to be construed in a limiting sense. Numerous modifications and variations within the spirit and scope of the invention will now occur to those skilled in the art. For a definition of the invention, reference is made to the appended claims.

I claim:

1. A polarization converter for electromagnetic waves comprising a pair of hollow rectangular waveguides having their longitudinal axes in alignment and their major lateral axes extending transversely of each other, a coupling member interposed between adjacent ends of said waveguides and defining a cruciform aperture including four rectangular channels disposed in opposed pairs with the side walls of each channel joining the side walls of the adjacent channels, the interior walls of each waveguide being aligned with the side walls of the corresponding pair of channels whereby the walls of the waveguides are effectively extended in overlapping relation throughout the axial length of the coupling member, and a pair of conductive probes extending diagonally into said aperture from opposite innermost corners of said side walls to match the impedance of the coupling member to said waveguides and to induce rotation of the plane of polarization of an electromagnetic wave transmitted from one waveguide to the other through said coupling member.

2. A polarization converter for electromagnetic waves of a given center frequency and comprising a pair of hollow rectangulaar waveguides having their longitudinal axes in alignment and their major lateral axes extending transversely of each other, a coupling member interposed between adjacent ends of said waveguides and defining a cruciform aperture including four rectangular channels disposed in opposed pairs with the side walls of each channel joining the side walls of the adjacent channels, the interior walls of each waveguide being aligned with the side walls of the corresponding pair of channels whereby the walls of the waveguides are effectively extended in overlapping relation throughout the axial length of the coupling member, said member having an axial length less than one-half wavelength at said center frequency, and a pair of conductive probes extending diagonally into said aperture from opposite innermost corners of said side walls, said probes being independently adjusted to establish an impedance match with said waveguides over a bandwidth of frequencies extending above and below said center frequency.

3. A polarization converter for electromagnetic waves comprising a pair of hollow rectangular waveguides terminating in lateral flanges, a coupling member defining a longitudinally extending cruciform aperture bounded by side walls forming two superposed, transverse rectangular cross sectional areas each corresponding to the interior dimensions of said waveguides, said waveguides being secured to said coupling member at opposite ends thereof with the interior walls of each waveguide aligned with the respective rectangular cross sectional area, and a pair of conductive probes supported by said member and extending diagonally into said aperture from opposite innermost corners of said side walls.

4. A polarization converter for transmitting electromagnetic waves of a given frequency and comprising a pair of hollow rectangular waveguides terminating in lateral flanges, a coupling member having an axial length less than one-half wavelength at said frequency and defining an axially extending cruciform aperture bounded by side walls forming two transverse, superposed rectangular cross sectional areas each corresponding to the interior dimensions of said waveguides, said waveguides being secured to said coupling member at opposite ends thereof by said flanges with the interior walls of each waveguide aligned with the respective rectangular cross sectional area, and a par of conductive probes supported by said member and extending diagonally into said aperture from opposite innermost corners of said side walls.

References Cited in the file of this patent

UNITED STATES PATENTS

| | | |
|---|---|---|
| 2,668,191 | Cohn | Feb. 2, 1954 |
| 2,691,766 | Clapp | Oct. 12, 1954 |
| 2,729,794 | Cohn | Jan. 3, 1956 |
| 2,825,031 | Parisi | Feb. 25, 1958 |